US012642185B2

(12) United States Patent
Gahres et al.

(10) Patent No.: US 12,642,185 B2
(45) Date of Patent: Jun. 2, 2026

(54) TRACTOR PTO CONTROL FOR ROUND BALER NET DAMAGE

(71) Applicant: CNH Industrial America LLC, New Holland, PA (US)

(72) Inventors: Jason Gahres, Robesonia, PA (US); Jonathan Shenk, Lititz, PA (US)

(73) Assignee: CNH Industrial America, LLC, New Holland, PA (US)

( * ) Notice: Subject to any disclaimer, the term of this patent is extended or adjusted under 35 U.S.C. 154(b) by 377 days.

(21) Appl. No.: 18/232,625

(22) Filed: Aug. 10, 2023

(65) Prior Publication Data

US 2025/0048970 A1     Feb. 13, 2025

(51) Int. Cl.
*A01F 15/08* (2006.01)
*B62D 33/03* (2006.01)

(52) U.S. Cl.
CPC .......... *A01F 15/0883* (2013.01); *B62D 33/03* (2013.01)

(58) Field of Classification Search
CPC ................................................. A01F 15/0883
See application file for complete search history.

(56) References Cited

U.S. PATENT DOCUMENTS

| | | | |
|---|---|---|---|
| 8,776,679 B1 * | 7/2014 | Henry ................. | A01F 15/0883 |
| | | | 100/88 |
| 9,241,443 B2 | 1/2016 | Anstey et al. | |
| 10,617,062 B2 | 4/2020 | Reijersen Van Buuren | |
| 11,617,308 B2 | 4/2023 | Weller et al. | |
| 2021/0212262 A1 | 7/2021 | Simmons | |
| 2022/0015299 A1 | 1/2022 | Weller et al. | |
| 2022/0192098 A1 * | 6/2022 | Smith ................. | A01F 15/0883 |

FOREIGN PATENT DOCUMENTS

| | | |
|---|---|---|
| EP | 2606715 B1 | 4/2015 |
| WO | 2017201466 A1 | 11/2017 |

* cited by examiner

*Primary Examiner* — Mohammed S. Alawadi
(74) *Attorney, Agent, or Firm* — Buchanan Ingersoll & Rooney PC

(57)     ABSTRACT

An agricultural baler includes a bale chamber, a tailgate arranged in a rear section of the bale chamber, and a controller. The tailgate moves between a closed position and an open position to eject a bale from the baler. The controller receives a signal indicating the bale status and, in response to the signal, stops the power take-off ("PTO") operation of a tractor connected to the baler or restarts the PTO operation.

14 Claims, 7 Drawing Sheets

<u>600</u>

TRACTOR PTO CONTROL FOR ROUND BALER NET DAMAGE

FIELD OF THE INVENTION

The present invention relates to agricultural balers, and, more particularly, to safe and efficient ejection of bales from round agricultural balers.

BACKGROUND OF THE INVENTION

Agricultural packaging machines, such as balers, for example, are used to consolidate and package crop material so as to facilitate the storage and handling of the crop material for later use. In the case of hay, a mower-conditioner cuts and conditions the crop material for windrow drying in the sun. In the case of straw, an agricultural combine discharges non-grain crop material from the rear of the combine defining the straw (such as wheat or oat straw, for example) which is to be picked up by the baler. The cut crop material is typically raked and dried, and a baler, such as a round baler, for example, travels along the windrows to pick up the crop material and form it into cylindrically-shaped round bales. More specifically, a pickup unit at the front of the baler gathers the cut and windrowed crop material from the ground and then conveys the cut crop material into a bale-forming chamber within the baler. When the bale has reached a desired size and/or density, a wrapping system wraps the bale to ensure that the bale maintains its shape and density. For example, a net may be used to wrap the bale of crop material. A cutting or severing mechanism may be used to cut the net once the bale has been wrapped. The wrapped bale may be ejected from the baler and onto the ground surface of the field by raising a tailgate of the baler. The tailgate is then closed and the cycle repeated as necessary and desired to manage the field of cut crop material.

Wrapping the bale in net material helps maintain the shape of the formed bale and protect the bale from, for example, rain or other harmful external conditions. However, certain baler configurations or crop types, such as corn stalks, for example, can interfere with the wrapping process and damage the net before or while the wrapped bale is being ejected from the baler. For example, the net can be damaged as the bale departs from the bale-forming chamber and transitions from the forward rolling motion components of the bale-forming chamber to the rearward rolling motion components needed to roll the bale down the ramp and out of the baler. In such instances, an unwrapped or a partially wrapped bale may be inadvertently released, and must be re-baled and re-wrapped. Stopping the rotation of the components of the bale-forming chamber just prior to ejecting the bale can mitigate this problem. However, known solutions rely on mechanical components, such as mechanical clutches, for example, which are costly.

What is needed in the art is an agricultural baler that can effectively provide a safe, efficient, and cost-effective bale ejection, without damaging the net.

SUMMARY OF THE INVENTION

Described herein is an improved automated baling system for round agricultural balers. The system uses an ISOBUS class 3 control, which incorporates global positioning inputs, two-way communications and two-way controls between tractor and implement, facilitated by an ISOBUS-compliant display, to shut down and restart the power take-off ("PTO") operation of a tractor connected to the baler, as directed by the baler controller, during the bale ejection sequence in order to substantially reduce or eliminate the possibilities of damaging the net.

An agricultural baler includes a baling system that controls the PTO start and stop operation relative to the bale status based on signals from various sensors. For example, based on a signal from a tailgate position sensor, the PTO can be commanded to stop at a 5° (degree) open angle and then the PTO can be commanded to restart at full open angle (87° or alternatively) 90° before the tailgate of the baler starts to close. The baling system can provide a precise control of the PTO start and stop relative to the bale status, without a mechanical clutch, resulting in cost-effective, safe, and efficient bale ejection, without damaging the net.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "forward," "rearward," "upward," "downward," "left," and "right," when used in connection with the agricultural baler described herein and/or components thereof are usually determined with reference to the direction of forward operative travel of the towing vehicle and the height of the baler, but they should not be construed as limiting. The terms "longitudinal" and "transverse" are determined with reference to the fore-and-aft direction of the towing vehicle and the width of the baler, and are equally not to be construed as limiting.

Agricultural balers, such as round balers, for example, are well known in the agricultural industry, and the instant invention can be used with substantially any of such machines. Reference is made, for example, to U.S. Pat. No. 8,776,679 that describes such balers, the disclosures of which is incorporated herein by reference in its entirety. For illustrative purposes, details of an exemplary round baler in which the features of the present invention may be used are disclosed in and will be described here in part with reference to U.S. Patent App. Pub. No. 2021/0212262, which is incorporated by reference herein in its entirety and for all purposes.

Figures 1A, 1B:
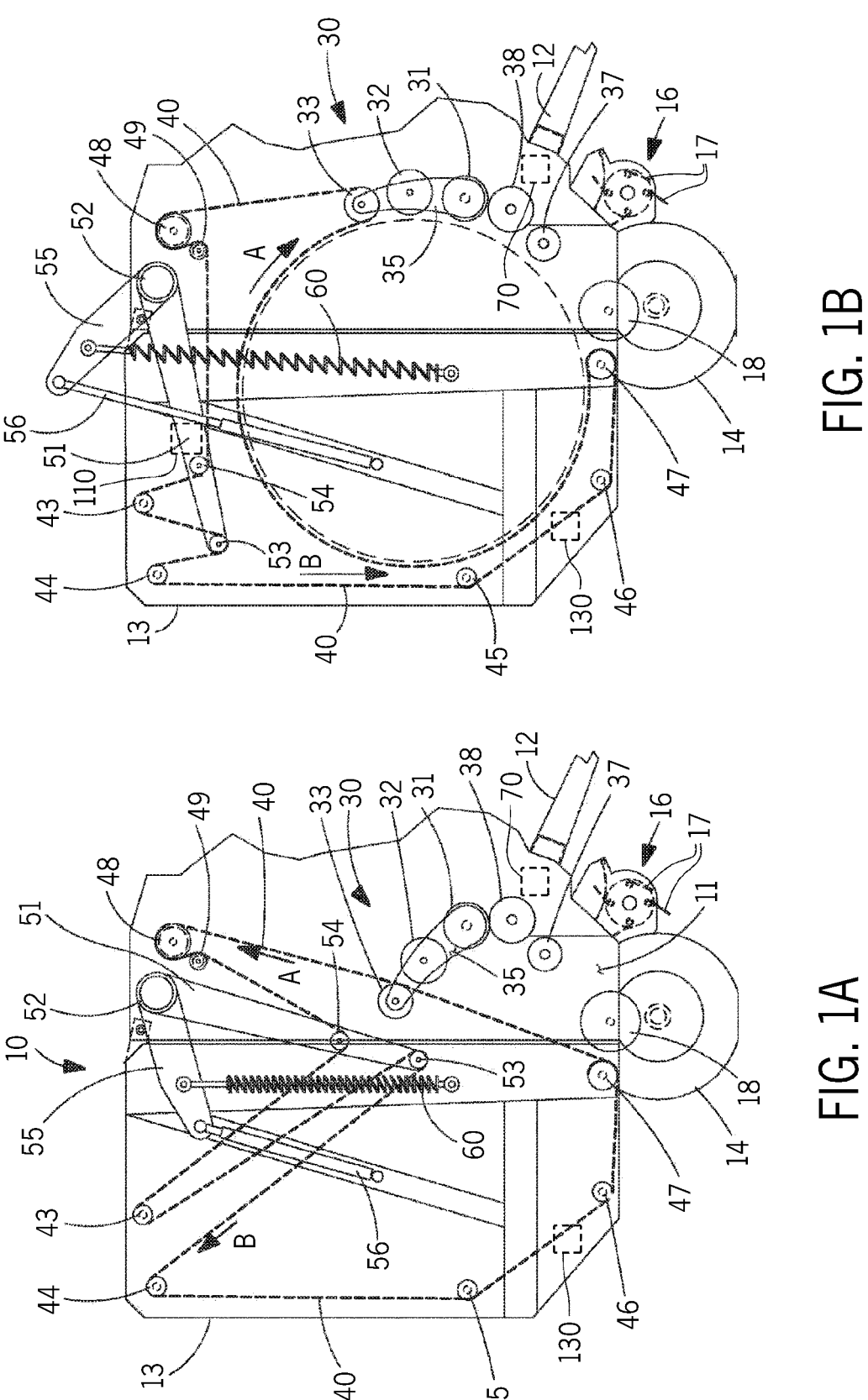
FIG. 1A illustrates a sectional view of an exemplary embodiment of an agricultural baler at a start of a bale formation cycle.
FIG. 1B illustrates a sectional view of the agricultural baler of FIG. 1A at an end of the bale formation cycle.
Figure 2:
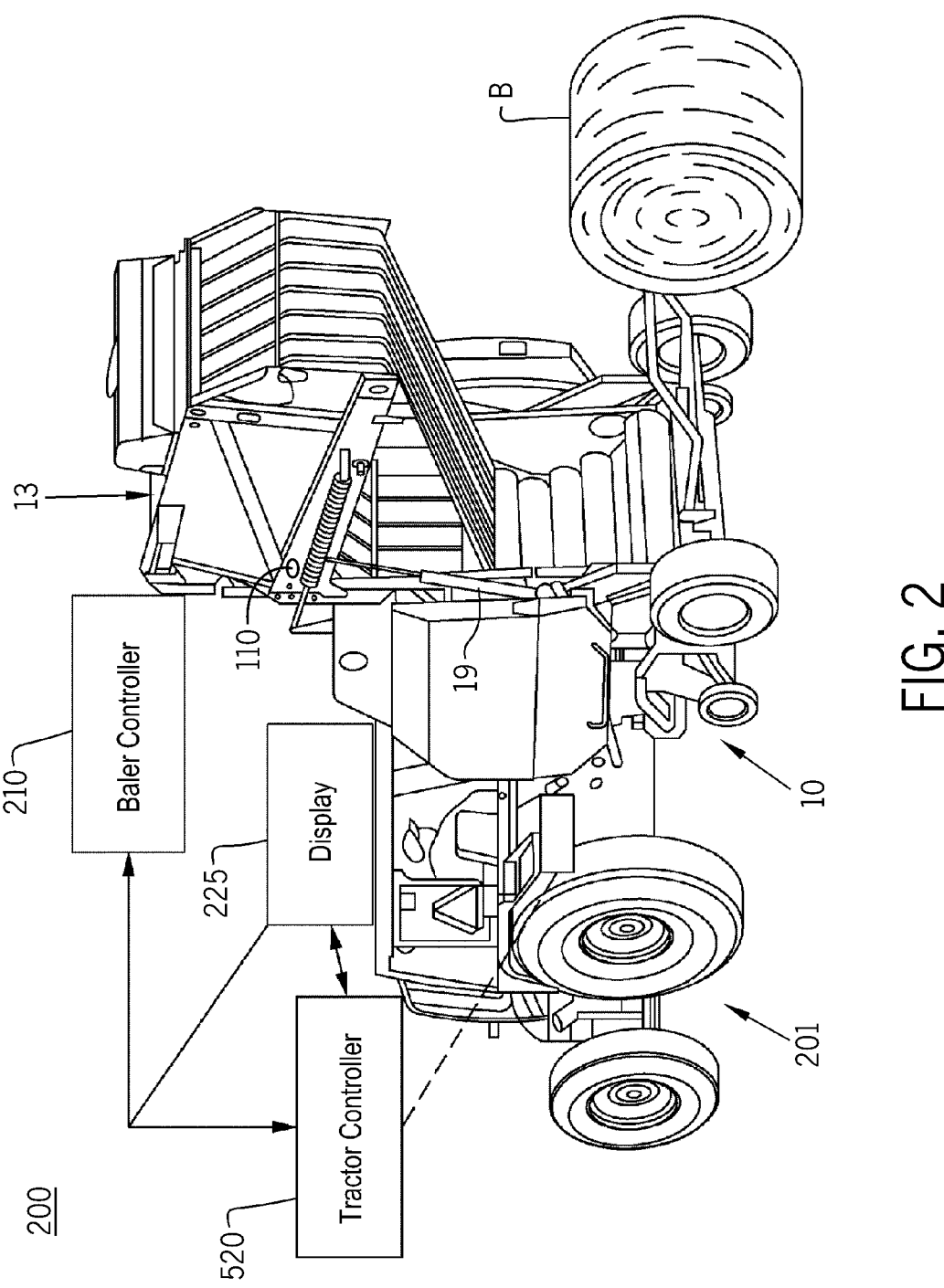
FIG. 2 illustrates a perspective view of a tow vehicle towing the baler of FIG. 1A.

Referring now to the drawings, and more particularly to FIGS. 1A, 1B and 2, illustrated is a round baler 10, which can be connected to and pulled behind an agricultural vehicle, such as a tractor 201 (shown in FIG. 2), for example. The baler 10 includes a chassis 11 (FIGS. 1A, 1B) supported by a pair of wheels 14 (only one shown). A tongue 12 is provided for connection to the tractor 201 (illustrated in FIG. 2). Pivotally connected to the sides of the chassis 11 is a tailgate 13 that may be closed during bale formation or pivoted open by a tailgate actuator 19 (illustrated in FIG. 2), which may also be referred to as a "bale release," to release a fully formed bale. A pickup 16, mounted on the chassis 11, includes a plurality of tines 17 movable in a predetermined path to lift crop material from the ground and deliver it rearwardly toward a rotatably mounted floor roll 18.

A bale-forming chamber 20 for forming bales is defined partly by a sledge assembly 30 including a plurality of rollers 31, 32 extending transversely in the arcuate arrangement shown in FIGS. 1A and 1B. Rollers 31, 32 are journalled at their ends in a pair of spaced apart arms 35, one of which is shown. The arms 35 are pivotally mounted inside the chassis 11 on stub shafts for providing movement of sledge assembly 30 between the bale starting position shown in FIG. 1A and the full bale position shown in FIG. 1B. Rollers 31, 32 are driven in a counter-clockwise direction by, e.g., chains and sprockets or gears, connected to and powered by a power source, such as an engine, via a drive shaft 15. A freely rotatable idler roller 33 is also carried by arms 35. Additionally, a starter roll 37 and a fixed roll 38 are located adjacent to roller 31, and are also driven in a counter-clockwise direction.

The bale-forming chamber 20 is further defined by an apron assembly 40 including a plurality of continuous side-by-side chains, which also may be referred to as belts, supported by guide rolls 43, 44, 45, 46, 47 rotatably mounted in tailgate 13 and a drive roll 48 mounted on chassis 11. Apron assembly 40 passes between roller 32 on sledge assembly 30 and idler roller 33, and is in engagement only with idler roller 33 and not roller 32 which is located in close proximity to the apron chains to strip crop material from the chains, in addition to its bale forming function. Drive roll 48 is powered via coupling to a coupler 70, which may be a power take-off (PTO) coupled to the tractor 201, and a drive train which moves apron assembly 40 along its changing path, indicated generally by arrows A and B in FIGS. 1A and 1B. Many different types of couplings between the drive roll 48 and the coupler 70 are known, so further description is omitted for brevity. An additional guide roll 49 ensures proper driving engagement between apron assembly 40 and drive roll 48.

A pair of take up arms 51 (only one shown) are mounted to pivot conjointly with a cross shaft 52 between inner and outer positions, shown in FIGS. 1A and 1B, respectively, and carry additional guide rolls 53, 54 for supporting apron assembly 40. Chain tension lever arm 55 is also affixed to shaft 52 to pivot with take up arms 51. A return spring 60 is secured between the chassis 11 and tension lever arm 55 to bias the shaft 52 and take up arms 51 toward the bale starting position (shown in FIG. 1A) and move the take up arms toward the bale starting position following release of a completed bale. An apron tensioning system, which may include a hydraulic bale tension cylinder 56, is mounted between tailgate 13 and take up arms 51 and configured to resist movement of the take up arms 51 from the bale starting position (FIG. 1A) toward the full bale position (FIG. 1B).

In operation, the baler 10 is hitched to the rear of the tractor 201. A power take-off (PTO) shaft of the tractor 201 is connected, via tongue 12, to the baler 10 to provide rotary power for powering the internal, bale-forming rotary components of the baler 10. The PTO shaft can rotate at a speed determined by the settings of the tractor engine and in some cases certain other variable parameters that are settable, e.g., by the tractor operator, or as a result of automatic or semi-automatic control actions initiated in the tractor 201 or the baler 10, such as when one or more sensors produces a particular output, class of output, value or range, for example.

According to an aspect of the present invention, and referring now specifically to FIG. 2, a baling system 200 includes the baler 10 with a baler controller 210 and a tractor 201 with a tractor controller 220 and a user interface (e.g., touchscreen display) 225 accessible by an operator in the tractor 201. The user interface 225 allows for the operator to see various control and status information, as well as to enter and configure information for use by the tractor controller 220 and the baler controller 210. The tractor controller 220 and the baler controller 210 are operatively coupled to one another for messaging and data communication. The user interface 225 is operatively coupled to the tractor controller 220 and may be operatively coupled to the baler controller 210 directly or indirectly through the tractor controller 220. In some embodiments, the tractor controller 220 and the baler controller 210 can be integrated in an ISOBUS system. In these embodiments, the controllers 210 and 220 may communicate on the ISOBUS network. It should thus be appreciated that an ISOBUS system may also be the "controller" referred to herein.

The baling system 200 can be used to support an automatic or a semi-automatic round baler ejection of a completed bale B with the use of, for example, at least one tailgate position sensor 110 (FIG. 2), a pressure sensor 120 (FIG. 5), a net-wrap-complete signal received from the controller 210 and indicating that the bale B is completely wrapped with net, pre-calibrated gate operation timing values, and/or manual intervention by an operator for triggering of the bale ejection, for example. The tailgate position sensor 110 measures and detects the rotational or angular movement of the mechanical components of the tailgate 13, and outputs tailgate position signals, which correspond to the open angle of the tailgate 13, e.g., the angle between the vertical portion 21 (FIG. 3A) of the side wall 23 of the baler 10 and the tailgate wall 25 of the tailgate 13. The pressure sensor 120 senses the pressure of the hydraulic fluid in the tailgate actuator 19 (e.g., if the tailgate actuator 19 is a hydraulic cylinder), converts the sensed pressure into an electric signal, and sends the electric signal to the controller 210. Proprietary or ISOBUS TECU Class 1 and 3 messaging can be used between the tractor controller 220, the baler controller 210, and optionally the user interface 225, to determine and request operations of the tractor 201 to facilitate bale ejection.

As illustrated in FIG. 2, the tailgate 13 is in an open position with the bale B ejected from the baler 10. In addition to the baler controller 210 and the components described above with reference to FIG. 2, the baler 10 can include a tailgate actuator 19 that is coupled to the tailgate 13. The tailgate actuator 19 can be, for example, an electric linear actuator, a pneumatic cylinder, or a hydraulic cylinder, e.g., a double acting hydraulic cylinder having a moveable piston and controlled by a hydraulic control circuit (illustrated in FIG. 4, for example). The tailgate actuator 19 may include, for example, a hydraulic cylinder and a flow valve 506 (shown in FIG. 4). The baler controller 210 is connected to the flow valve 506 to control a flow of fluid to the tailgate actuator 19. By controlling the hydraulic flow rate of fluid to the hydraulic cylinder, the baler controller 210 controls opening the tailgate 13 to release a formed and wrapped bale B and closing the tailgate 13 after the formed and wrapped bale B is ejected to the ground surface of the field to resume the baling operation.

However, embodiments are not limited to this configuration, and in other embodiments, the tailgate actuator 19 may include a pulley system, an electric motor, a solenoid, etc.

Figure 3B:
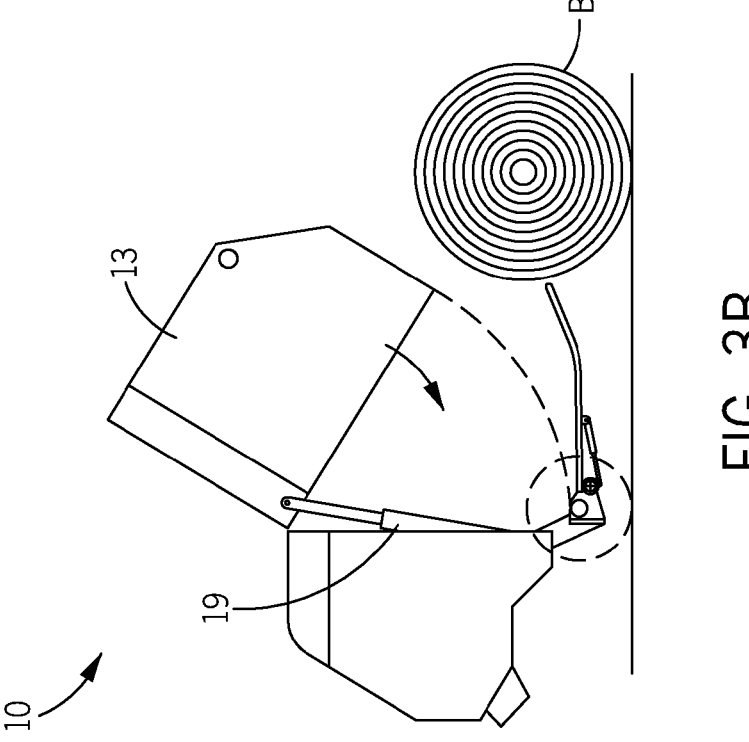
FIG. 3B illustrates a side view of the agricultural baler of FIG. 1A with a tailgate in a position in which closing of the tailgate has commenced.
Figure 3A:
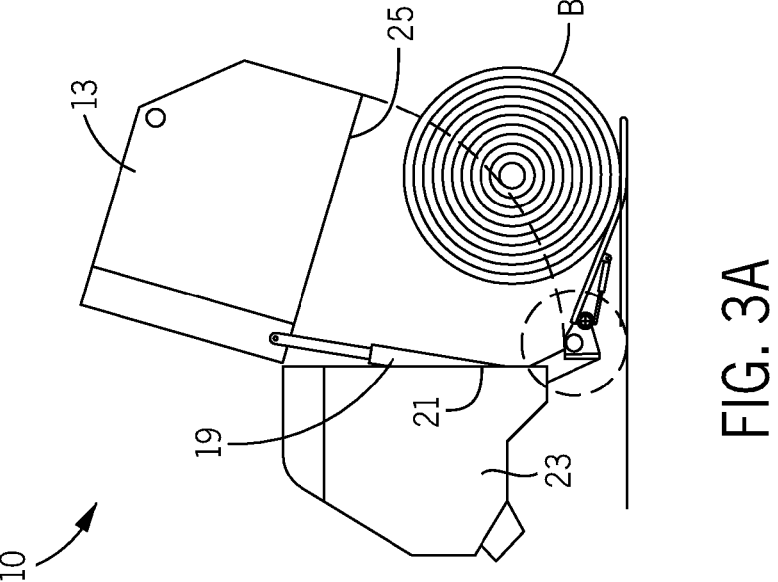
FIG. 3A illustrates a side view of the agricultural baler of FIG. 1A with a tailgate in an open position.

FIGS. 3A and 3B provide side views of the baler 10 (without the tractor 201 or other equipment connected to the baler 10) with the tailgate 13 in an open position and in a position in which closing of the tailgate 13 has commenced, respectively. In FIG. 3A, the bale B is completed and the tailgate 13 is in the open position to allow the bale B to be ejected. In FIG. 3B, the bale B has been ejected in accordance with the bale ejection operations described herein, and closing of the tailgate 13 has commenced.

The tailgate actuator 19 may be configured to be mounted between the chassis 11 and the tailgate 13, for example. Optionally, cylinder support 39 may be provided between the chassis 11 and the tailgate actuator 19 for mounting and securing the tailgate actuator 19 to the baler 10.

The tailgate actuator 19 can include a rod 42. Movement of the rod 42 within the cylinder 39 of the tailgate actuator 19 translates to the tailgate 13. For example, when the rod 42 is extended (see FIG. 3A), the tailgate 13 is open. Conversely, when the rod 42 is retracted, the tailgate 13 is closed.

The tailgate 13 can be driven to rotate between the raised and lowered positions by a hydraulic motor, an electric motor, or the like. The tailgate actuator 19 can be connected to the baler controller 210, to an actuation circuit, to hydraulic motor, an electric motor, or the like, or to other systems of the baler 10 by a hydraulic hose or a conduit, and/or by way of electric wires, cables, a bundle of wires or cables, or a wiring harness that includes various stranded or solid wires that interconnect the tailgate actuator 19 with various mechanical, hydraulic, or electrical components of the baler 10, for example.

Figure 4:
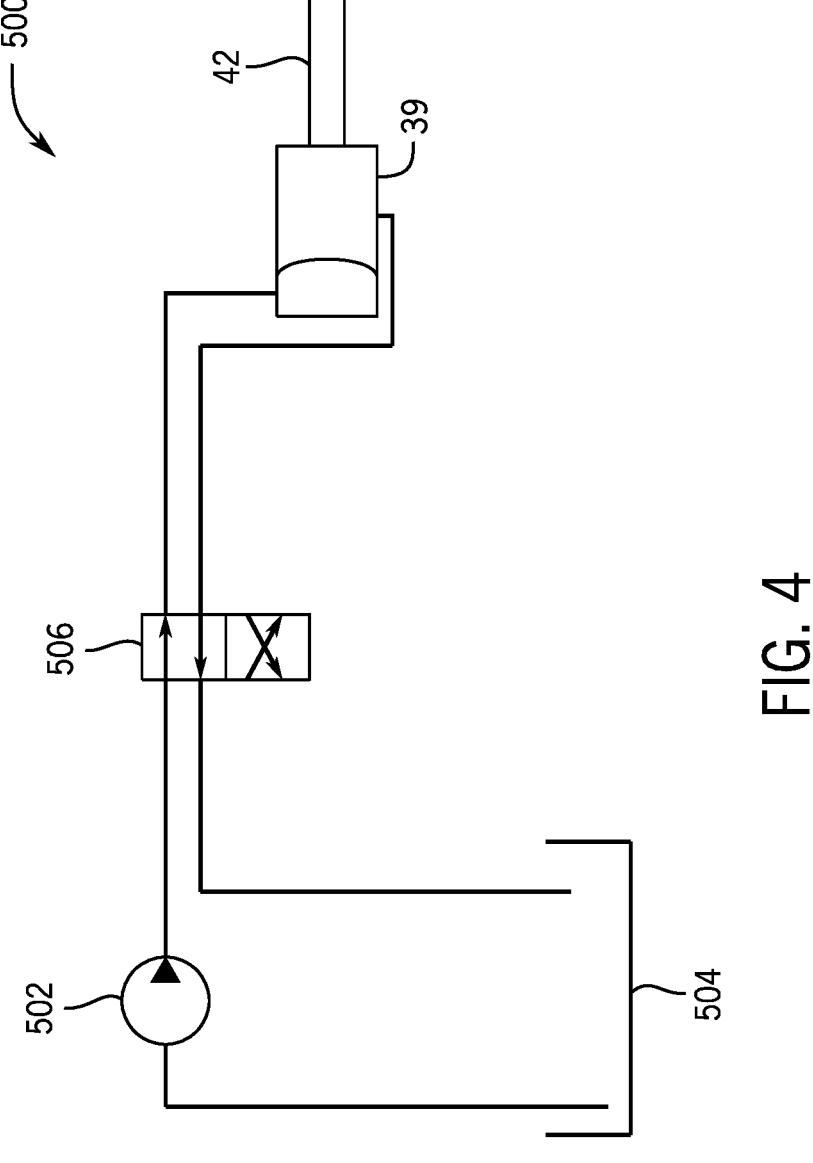
FIG. 4 is a schematic diagram of an exemplary hydraulic control circuit for use with the baling system according to an embodiment.

In the embodiments in which the tailgate actuator 19 illustrated in FIG. 2, is a hydraulic cylinder, the baling system 200 can include a hydraulic control circuit 500, an exemplary embodiment of which is depicted in FIG. 4, for example. The hydraulic control circuit 500 can include a hydraulic pump 502, such as a unidirectional hydraulic pump, for example, for pumping hydraulic fluid from a fluid reservoir 504 into the hydraulic control circuit 500. An outlet of the pump 502 and an inlet of the reservoir 504 may be connected to a directional-control valve 506, e.g., a 4-port 2-position directional-control valve or a three-way valve, for example, operable by means of a lever or a button, or by means of an electronic control unit, having work ports connected to the tailgate actuator 19, for example, to control the hydraulic fluid flow to the hydraulic cylinder of the tailgate actuator 19. The directional-control valve 506 can be configured for switching the flow direction between the retracted position, in which closing of the tailgate 13 has commenced (FIG. 3B) and the extended position, in which the tailgate 13 is open (FIG. 3A) of the tailgate actuator 19. This way, the tailgate actuator 19 will open the tailgate 13 in one setting of the directional-control valve 506 while closing the tailgate 13 in the other setting of the directional-control valve 506. Switching between both settings of the directional-control valve 506 will therefore result in reciprocation of the tailgate actuator 19, and thereby in opening and closing the tailgate 13. The directional-control valve 306 may further include a third, neutral setting (not illustrated in FIG. 4), in which hydraulic fluid flow is inhibited, for disabling the tailgate actuator 19. Alternatively, the tailgate actuator 19 may be disabled by powering down the hydraulic pump 502. The hydraulic control circuit 500 may further include means for automatic switching between the first and second setting of the directional-control valve 506, e.g., at a fixed frequency, for example driven by an electric resonator circuit (not shown), in order to automate the reciprocating motion of the tailgate actuator 19 to open and close the tailgate 13.

Figure 5:
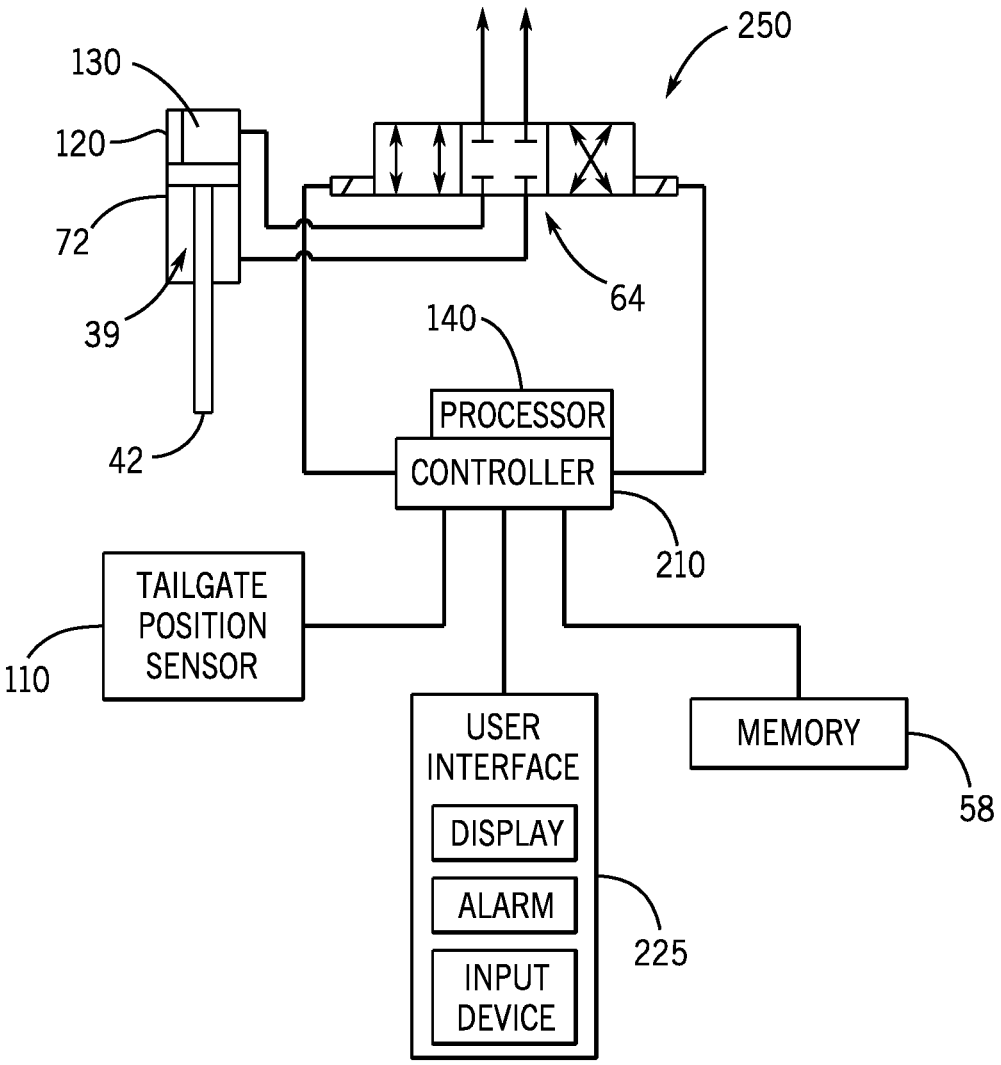
FIG. 5 is a schematic diagram of an exemplary control circuit for use with the baling system according to an embodiment.

To facilitate management of the baling process, the baling system 200 can include a control system 250, illustrated in FIG. 5, for example. In the illustrated embodiment, the control system includes a controller 210, a user interface 225, at least one tailgate position sensor 110, and a hydraulic control circuit similar to the hydraulic control circuit 500 shown in FIG. 4, for example. The controller 210 can be configured to receive signals from sensors (e.g., the tailgate position sensor 110 and the pressure sensor 120 discussed below) associated with the baling system 200, and from the operator through the user interface 225. In addition, the controller 210 can be configured to send signals to the hydraulic control circuit 500 to operate valve(s) that control fluid flow to the hydraulic cylinder of the tailgate actuator 19. For example, the controller 210 can be configured to receive the signal from the tailgate position sensor 110 and to send a control signal to the hydraulic control circuit 500 to activate a piston of the tailgate actuator 19 to extend and retract (e.g., via pumps, valves, etc.). Specifically, in the embodiment illustrated in FIG. 5, the controller 210 may send a signal to a three-way valve 64. The signal from the controller 210 can instruct the three-way valve 64 to move into a position that enables hydraulic fluid to flow to a cap end 130 of the tailgate actuator 19. At the cap end 130, the pressure of the hydraulic fluid causes the piston rod 42 to extend out of the cylinder 72, into an extended position. As a result, the tailgate 13 may be opened, as illustrated in FIG. 3A, for example. Conversely, the controller 210 may send another signal to the three-way valve 64 that instructs the three-way valve 64 to move into a position that enables hydraulic fluid to drive the piston rod 42 back into the cylinder 72, into a retracted position. As a result, the tailgate 13 may start to close, as illustrated in FIG. 3B, for example. A pressure sensor 120 can be configured to sense the pressure of the hydraulic fluid, convert the sensed pressure into an electric signal, and send the electric signal to the controller 210.

In the embodiment illustrated in FIG. 5, the control system 210 includes a memory 58 and a processor 140. The memory 58 may be any type of non-transitory machine readable medium for storing data and executable instructions, such as random-access memory, read-only memory, rewritable flash memory, hard drives, optical discs, and the like. The processor 140 may execute instructions stored on the memory 58. For example, the memory 58 may contain machine readable code, such as instructions, that may be executed by the processor 140. In some embodiments, the memory 58 and processor 140 may enable automatic (e.g., processor/memory controlled) ejection of the bale B.

In known balers, the controller normally signals for a bale to be released when the wrap cycle finishes. However, there are instances when certain crop types, such as corn stalks, for example, can interfere with the wrapping process and damage the net before or while the bale is being ejected from the baler. In such a case, although the net can be damaged as the bale departs from the bale-forming chamber and transitions to roll down the ramp and out of the baler, the controller may incorrectly signal for the tailgate to open and release the bale. The released, unwrapped or partially wrapped bale would then need to be re-baled and re-wrapped, which is inconvenient for an operator.

To address these issues, and referring to FIG. 2 again, the baler 10 includes a tailgate position sensor 110 that can be arranged in proximity to the tailgate 13 and the actuator 19. The tailgate position sensor 110 can be, for example, a magnetic rotary sensor configured to measure and detect the rotational or angular movement of the mechanical components of the tailgate 13. The tailgate position sensor 110 can be configured to output tailgate position signals, which correspond to the open angle of the tailgate 13, e.g., the angle between the vertical portion 21 (FIG. 3A) of the side wall 23 of the baler 10 and the tailgate wall 25 of the tailgate 13. The open angle of the tailgate 13 can have a range between 0 degrees and 90 degrees, for example.

The tailgate position sensor 110 is operatively coupled to a controller. For convenience of description, the baler controller 210 is referred to as "the controller" further herein, but it should be appreciated that the controller provided according to the present disclosure may be the baler controller 210, the tractor controller 220, and/or the ISOBUS system including the controllers 210, 220, or other controllers.

The baler controller 210 can be configured to automatically manage the hydraulic channel on the tractor 201 connected to the tailgate ejection hydraulics for the baler 10, such that a hydraulic extension of the actuator 19 opens the tailgate 13 and hydraulic retraction of the actuator 19 closes the tailgate 13. The baler controller 210 can further be configured to automatically manage the power take-off (PTO) control configuration to turn off and on the PTO during the bale ejection. The baler controller 210 may also be configured to automatically identify the speed below which it is safe to perform tailgate operations and to cutoff the PTO should it sense an over-torque situation from the tractor 201.

During operation, the baler controller 210 can allow for an operator override input to completely cancel automatic ejection operations. Such a cancellation has the effect of stopping all hydraulic flow to a blocked state, leaving the tailgate 13 and other parts of the baler 10 frozen at the state and position when the cancel is commanded. The operator can initiate the cancellation through entry of a command via the tractor operator display interface 225, for example.

To provide more effective bale ejection control and machine safe operations, the baler controller 210 can be configured and programmed to perform tractor power take-off (PTO) control. In some embodiments, the baling system 200 uses the PTO from the tractor 201 to augment the baling process. For machine safety, it is useful to disengage the PTO during bale ejection. The PTO stays engaged during the bale wrapping, disengages during bale ejection, and is re-engaged prior to the forward motion of the tractor 100 to ensure proper pickup for a new bale. To facilitate this process, for example, the baler controller 210 can issue a PTO speed 0% request to the tractor 201. When the tailgate 13 is near completion of closing after ejection of the bale B, the baler controller 210 can restart the PTO with a speed 100% request to the tractor 201, for example.

Optionally, the baling system 200 may provide an operator input to control whether the baler 10 (i.e., the baler controller 210) commands the PTO operations. In some embodiments, the baling system 200 can allow operator input to control the timing for stopping the PTO once the tailgate 13 has begun opening. In other embodiments, it may be desired by the operator to continue the PTO operations during the first portion of the tailgate 13 opening to ensure the wrapping is complete while allowing the tailgate 13 to begin opening for an earlier ejection of the bale. The baler controller 210 may automatically restart the PTO once the tailgate closing sequence has begun slowing down the tailgate 13 for final closure. The operator may issue a "cancel operations" command, via the tractor display interface 225, to disengage the PTO.

Figure 6A:
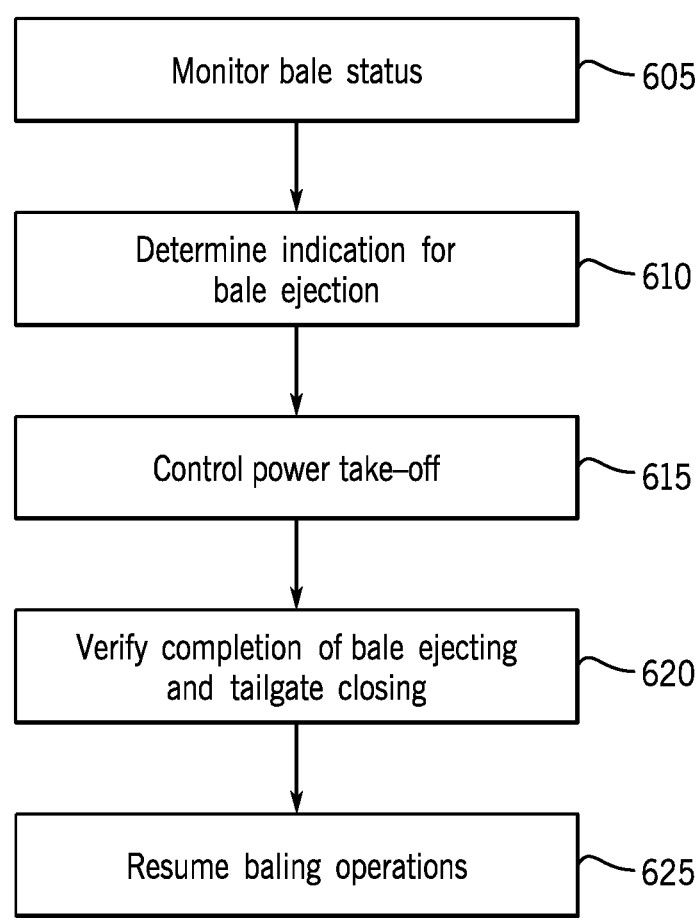
FIG. 6A is a flowchart illustrating a method of PTO control, according to an embodiment.

FIG. 6A is a flowchart illustrating a method 600 of PTO control, according to an embodiment. At step 605, the baler controller 210 monitors various signals that indicate a bale status. The monitored signals that indicate the bale status may include, for example, one or more signals received from the tailgate position sensor 110 detecting the open angle of the tailgate 13, one or more signals received from the pressure sensor 120 indicating the pressure of the hydraulic fluid in the hydraulic circuit of the actuator 19, and/or a net-wrap-complete signal received from the controller 210, indicating that the bale B is completely wrapped with net.

At step 610, based upon the monitored signals indicating the bale status, the baler controller 210 determines an indication for bale ejection. The indication for bale ejection may include, for example, a predetermined value of the open angle of the tailgate 13. For example, if the baler controller 210 receives a signal from the tailgate position sensor 110 indicating that the open angle of the tailgate 13 is at least 5 degrees, the baler controller 210 determines that the bale wrapping process is completed and the tailgate 13 has started to open. Based on this determination, the baler controller 210 can stop the PTO operation of the tractor to avoid damage to the net of the bale B.

In another embodiment, if the baler controller 210 receives a signal from the pressure sensor 120 indicating that the pressure in the hydraulic circuit is higher than a first predetermined value, the baler controller 210 determines that the bale wrapping process is completed and the tailgate 13 has started to open. Based on this determination, the baler controller 210 can stop the PTO operation of the tractor to avoid damage to the net of the bale B. The first predetermined value of the pressure in the hydraulic circuit and/or any other pressure thresholds can be determined by testing and can be tuned for maximum performance of the system. Once the most suitable predetermined values of the pressure in the hydraulic circuit and/or any other pressure thresholds are determined, these values can be programmed in the memory of the baler controller 210 and/or in the software of the baler controller 210 as fixed predetermined pressure values and/or pressure thresholds.

In yet another embodiment, if the baler controller 210 receives a net-wrap-complete signal pre-programmed in the software of the controller 210 indicating that the bale B is completely wrapped with net, the baler controller 210 determines that the bale wrapping process is completed and the tailgate 13 will soon start to open. Based on this determination, the baler controller 210 can stop the PTO operation of the tractor to avoid damage to the net of the bale B.

At step 615, the baler controller 210 can implement and control the tractor PTO. The PTO control is described in greater detail with respect to FIG. 6B.

Once the PTO control is implemented, at step 620, the baler controller 210 verifies completion of the bale ejection and closing of the tailgate 13. This verification may be achieved by using signal from the tailgate position sensor 110 or the pressure sensor 120, described above, for example.

At step 625, the baler controller 210 resumes the baling operations.

Figure 6B:
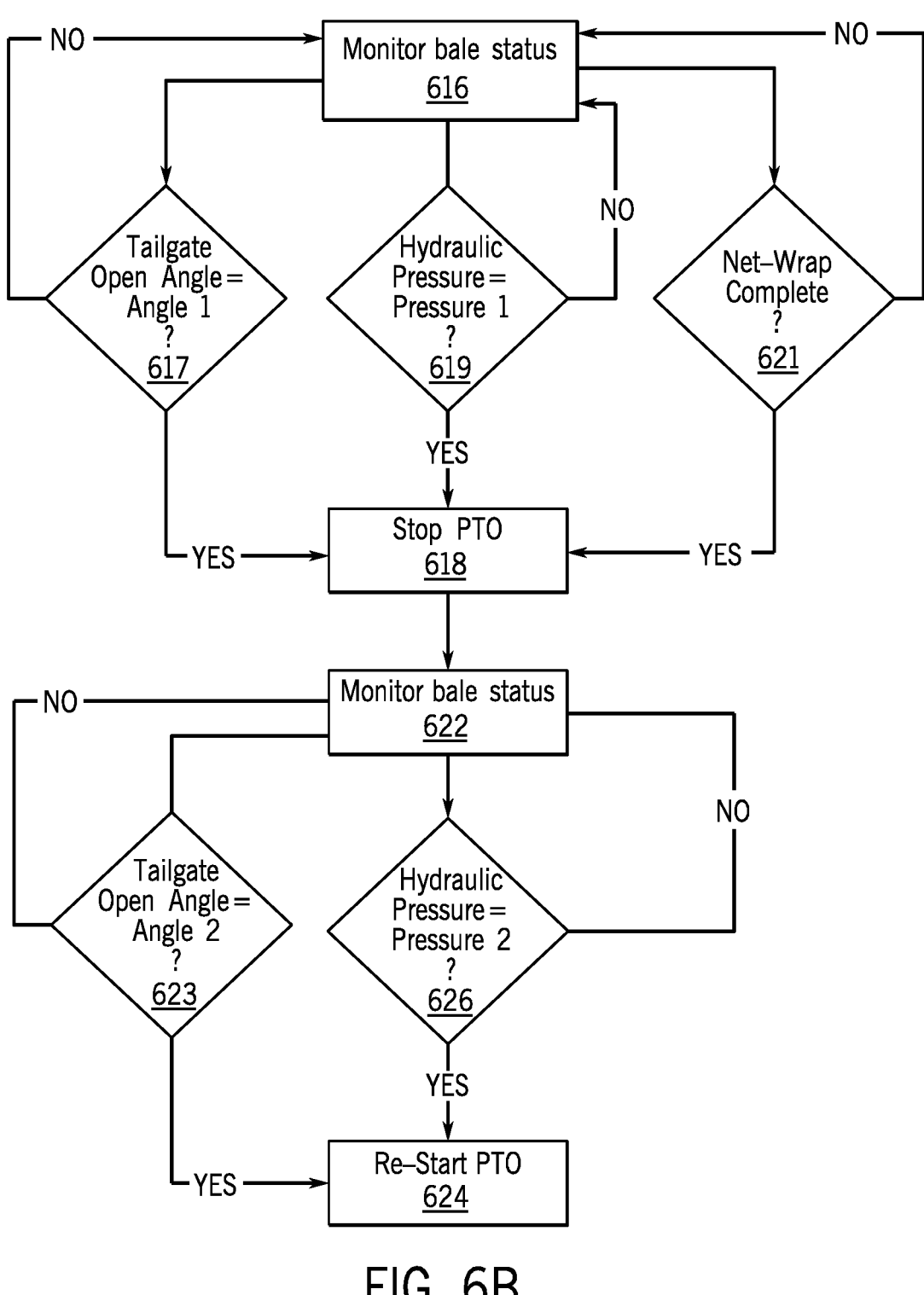
FIG. 6B is a flowchart illustrating details of the method of PTO control of FIG. 6A, according to an embodiment.

FIG. 6B illustrates details of the PTO control (step 615) of FIG. 6A. The PTO control begins at step 616 at which the baler controller 210 monitors various signals that indicate bale status and, for example, completion of the bale wrapping. The monitored signals that indicate the bale status may include, for example, one or more signals received from the tailgate position sensor 110 detecting the open angle of the tailgate 13, one or more signals received from the pressure sensor 120 indicating the pressure of the hydraulic fluid in the hydraulic circuit of the actuator 19, and/or a net-wrap-complete signal received from the controller 210, indicating that the bale B is completely wrapped with net.

In step 617, if the signal from the tailgate position sensor 110 indicates that the open angle of the tailgate 13 is equal to, or higher than, than a first predetermined angle (e.g., 5° degrees), which indicates that the tailgate has started opening, the baler controller 210 determines that the bale wrapping process is completed and bale ejection can be initiated. The baler controller 210 disengages or stops the tractor PTO (step 618), which stops the movement of the bale-forming rotary components of the baler 10.

If the signal from the tailgate position sensor 110 indicates that the open angle of the tailgate 13 is not equal to, or higher than, than the first predetermined angle (e.g., 5° degrees), the baler controller 210 continues to monitor the signals (step 616) that indicate bale status and, for example, completion of the bale wrapping.

In step 619, if the signal from the pressure sensor 120 indicates that the pressure of the hydraulic fluid in the tailgate actuator 19 is higher than a first predetermined pressure value (e.g., that is programmed in the memory of the baler controller 210 and/or in the software of the baler controller 210), which indicates that the tailgate has started opening, the baler controller 210 determines that the bale wrapping process is completed and bale ejection can be initiated. The baler controller 210 disengages or stops the tractor PTO (step 618), which stops the movement of the bale-forming rotary components of the baler 10.

If the signal from the pressure sensor 120 indicates that the pressure of the hydraulic fluid in the tailgate actuator 19 is not higher than the first predetermined pressure value, the baler controller 210 continues to monitor the signals (step 616) that indicate bale status.

In step 621, if the baler controller 210 receives a net-wrap-complete signal pre-programmed in the software of the controller 210 indicating that the bale is completely wrapped with net, the baler controller 210 determines that the bale wrapping process is completed and bale ejection can be initiated. The baler controller 210 disengages or stops the tractor PTO (step 618), which stops the movement of the bale-forming rotary components of the baler 10. The net-wrap-complete signal can further trigger an alarm and alert the operator to manually initiate cycling of the tractor systems (e.g., PTO) and/or the baler systems (e.g., pickup, bale rotating components, etc.) and eject the bale.

If the baler controller 210 does not receive a net-wrap-complete signal, the baler controller 210 continues to monitor the signals (step 616) that indicate bale status.

In step 622, after the PTO is stopped (step 618), the baler controller 210 continues to monitor the signals received from the tailgate position sensor 110 and the pressure sensor 120.

In step 623, if the baler controller 210 receives a signal from the tailgate position sensor 110 indicating that the open angle of the tailgate 13 is equal to a second predetermined angle (e.g., 87° or alternatively) 90°, indicating that the tailgate 13 is fully open and the bale has been ejected, the baler controller 210 re-engages the PTO operation of the tractor 201 (step 624) to resume the baling operations.

If the signal from the tailgate position sensor 110 indicates that the open angle of the tailgate 13 is not equal to a second predetermined angle (e.g., 87° or alternatively) 90°, the baler controller 210 continues to monitor (step 622) the signals from the pressure sensor 120 and the pressure sensor 120.

In step 626, if the baler controller 210 receives a signal from the pressure sensor 120 indicating that the pressure of the hydraulic fluid in the tailgate actuator 19 is higher than a second predetermined pressure value, which indicates that the tailgate 13 is fully open and the bale has been ejected, the baler controller 210 re-engages the PTO operation of the tractor 201 (step 624) to resume the baling operations. The second predetermined value of the pressure in the hydraulic circuit and/or any other pressure thresholds can be determined by testing and can be tuned for maximum performance of the system. Once the most suitable predetermined values of the pressure in the hydraulic circuit and/or any other pressure thresholds are determined, these values can be programmed in the memory of the baler controller 210 and/or in the software of the baler controller 210 as fixed predetermined pressure values and/or pressure thresholds.

If the signal from the pressure sensor 120 indicates that the pressure of the hydraulic fluid in the tailgate actuator 19 is not higher than the second predetermined pressure value, the baler controller 210 continues to monitor (step 622) the signals from the pressure sensor 120 and the pressure sensor 120.

The controllers 210 and 220 may be one or more processing devices, computing devices, processors, or the like for performing calculations and operations described herein. The controllers 210 and 220 interface with one another and the tractor operator display interface 225, as well as with components of the baler 10 and the tractor 201, and may also interface with one or more memory devices (not shown) such as read only memory (ROM), random access memory (RAM), and one or more optional non-transitory memory devices such as, for example, an external or internal DVD drive, a CD ROM drive, a hard drive, flash memory, a USB drive, or the like. The memory devices may be configured to include individual files and/or one or more databases for storing any software modules, instructions, or data.

It is to be understood that the above-described operating steps are performed by the controller 210 (or 220) upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 210 (or 220) described herein, such as the aforementioned method of operation, is implemented in software code or instructions which are tangibly stored on the tangible computer readable medium. Upon loading and executing such software code or instructions by the controller 210 (or 220), the controller 210 (or 220) may perform any of the functionality of the controller 210 (or 220) described herein, including any steps of the aforementioned method described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Program instructions, software, or interactive modules for performing any of the functional steps associated with the processes as described above may be stored in the ROM and/or the RAM. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

A display interface may permit information from the controllers 210 and 220 to be displayed on the tractor operator display interface 225, as well as other displays, such as remote displays, for example, in audio, visual, graphic, and/or alphanumeric format. Communication with external devices may occur using various communication ports that may be attached to one or more communications networks, such as the Internet or a local area network, or directly to a portable computing device such as a notebook computer. An interface may allow for receipt of data from input devices such as a keyboard, a mouse, a joystick, a touch screen, a remote control, a pointing device, a video input device, an audio input device, and the like.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural baler, comprising:
   a bale chamber;
   a tailgate arranged in a rear section of the bale chamber, the tailgate being configured to move between a closed position and an open position to eject a bale from the agricultural baler;

a controller operatively connected to the agricultural baler, the controller being configured to:
   (a) receive a first signal indicating that the bale has completed wrapping and the tailgate has begun to move to the open position but has not yet reached the open position;
   (b) in response to the first signal, stop a power take-off ("PTO") operation of a tractor connected to the agricultural baler;
   (c) receive a second signal indicating that the tailgate has reached the open position; and
   (d) in response to the second signal, restart the PTO operation of the tractor connected to the agricultural baler.

2. The agricultural baler of claim 1, further comprising a hydraulic system connected to the tailgate and configured to move the tailgate between the closed position and the open position.

3. The agricultural baler of claim 2, wherein the signals are received from at least one of a first sensor detecting an open angle of the tailgate or a second sensor detecting a pressure in a hydraulic circuit.

4. The agricultural baler of claim 3, wherein the controller is configured to stop the PTO operation of the tractor when the pressure in the hydraulic circuit is higher than a first predetermined value.

5. The agricultural baler of claim 4, wherein the controller is configured to restart the PTO operation of the tractor when the pressure in the hydraulic circuit is higher than a second predetermined value.

6. The agricultural baler of claim 3, wherein the open angle of the tailgate is an angle between a side wall of the agricultural baler and a tailgate wall of the tailgate.

7. The agricultural baler of claim 3, wherein the open angle is in a range of 0 degrees and 87 degrees.

8. The agricultural baler of claim 7, wherein the controller is configured to stop the PTO operation of the tractor when the open angle is at least 5 degrees.

9. The agricultural baler of claim 7, wherein the controller is configured to restart the PTO operation of the tractor when the open angle is 87 degrees.

10. The agricultural baler of claim 1, wherein the first signal is a net-wrap-complete signal received from the controller, said net-wrap-complete signal indicating that the bale is completely wrapped with net.

11. The agricultural baler of claim 10, wherein the controller is configured to stop the PTO operation of the tractor after receiving the net-wrap-complete signal.

12. The agricultural baler of claim 1, wherein the PTO operation is stopped automatically in response to the first signal.

13. An agricultural vehicle comprising the agricultural baler of claim 1.

14. The agricultural baler of claim 1, wherein the second signal further indicates that the tailgate has not yet moved to the closed position.

* * * * *